（12） United States Patent
Yuasa et al.

(10) Patent No.: US 9,038,392 B2
(45) Date of Patent: May 26, 2015

(54) GAS TURBINE COMBUSTOR

(75) Inventors: Saburo Yuasa, Tokyo (JP); Takashi Sakurai, Tokyo (JP); Motohide Murayama, Tokyo (JP); Katsuhiro Minakawa, Tokyo (JP)

(73) Assignees: IHI Corporation, Tokyo (JP); Tokyo Metropolitan University, Tokyo (JP)

( * ) Notice: Subject to any disclaimer, the term of this patent is extended or adjusted under 35 U.S.C. 154(b) by 964 days.

(21) Appl. No.: 12/446,402

(22) PCT Filed: Oct. 17, 2007

(86) PCT No.: PCT/JP2007/070232
§ 371 (c)(1),
(2), (4) Date: Apr. 20, 2009

(87) PCT Pub. No.: WO2008/047825
PCT Pub. Date: Apr. 24, 2008

(65) Prior Publication Data
US 2010/0313570 A1    Dec. 16, 2010

(30) Foreign Application Priority Data

Oct. 20, 2006  (JP) ................................. 2006-285906

(51) Int. Cl.
*F23R 3/12* (2006.01)
*F23R 3/06* (2006.01)
(Continued)

(52) U.S. Cl.
CPC . *F23R 3/286* (2013.01); *F23R 3/58* (2013.01); *F23R 3/06* (2013.01); *F23R 3/12* (2013.01); *F23R 3/52* (2013.01); *Y02T 50/675* (2013.01)

(58) Field of Classification Search
CPC ................ F23R 3/58; F23R 3/02; F23R 3/04; F23R 3/06; F23R 3/12; F23R 3/14; F23R 3/18; F23R 3/286; F23R 3/50; F23R 3/52; F23R 2900/00015; F23R 2900/03282; F05D 2260/14

USPC .......... 60/737, 738, 744, 748, 746, 750, 732, 60/39.826; 239/399, 403, 405
See application file for complete search history.

(56) References Cited

U.S. PATENT DOCUMENTS 2,398,654 A     4/1946   Lubbock et al.
4,052,844 A *  10/1977  Caruel et al. .................... 60/738
(Continued)

FOREIGN PATENT DOCUMENTS

JP       59147921   *  8/1984   .............. F23D 11/24
JP       2-502847       9/1990
(Continued)

OTHER PUBLICATIONS

Office Action dated Sep. 6, 2011, 2011 in corresponding Japanese Application No. 2007-070232.
(Continued)

*Primary Examiner* — Andrew Nguyen
(74) *Attorney, Agent, or Firm* — Griffin & Szipl, P.C.

(57) ABSTRACT

A gas turbine combustor includes inner and outer liners that are concentric and cylindrical, and an end liner closing between upstream ends thereof and forming a hollow cylindrical combustion chamber therein, and a swirling air flow forming device introducing combustion air about the end liner from outside and forming a swirling air flow, a fuel ejector ejecting fuel in the swirling direction to form a premixed swirling flow, and an igniter igniting the premixed swirling flow to form a tubular flame surface. The combustion chamber includes a primary combustion chamber, a secondary combustion chamber disposed downstream of the primary combustion chamber, and an annular restrictor reducing the outer diameter of the primary combustion chamber and disposed therebetween. A diluting air hole, supplying diluting air along a flow of the combustion gas passing through the restrictor, is disposed downstream of the restrictor in the inner liner.

9 Claims, 11 Drawing Sheets

(51) Int. Cl.
　　　*F23R 3/28*　　(2006.01)
　　　*F23R 3/58*　　(2006.01)
　　　*F23R 3/52*　　(2006.01)

(56) References Cited

U.S. PATENT DOCUMENTS

| | | | |
|---|---|---|---|
| 4,054,028 A * | 10/1977 | Kawaguchi | 60/39.23 |
| 4,092,826 A * | 6/1978 | Pask | 60/743 |
| 4,265,615 A * | 5/1981 | Lohmann et al. | 431/353 |
| 4,891,936 A | 1/1990 | Shekleton et al. | |
| 5,025,622 A * | 6/1991 | Melconian | 60/39.464 |
| 5,081,844 A * | 1/1992 | Keller et al. | 60/737 |
| 5,150,570 A | 9/1992 | Shekleton | |
| 5,156,002 A * | 10/1992 | Mowill | 60/738 |
| 5,450,724 A | 9/1995 | Kesseli et al. | |
| 5,479,781 A | 1/1996 | Fric et al. | |
| 5,966,926 A * | 10/1999 | Shekleton et al. | 60/39.094 |
| 6,684,642 B2 | 2/2004 | Willis et al. | |
| 6,729,141 B2 * | 5/2004 | Ingram | 60/804 |
| 6,845,621 B2 * | 1/2005 | Teets | 60/804 |

FOREIGN PATENT DOCUMENTS

| | | |
|---|---|---|
| JP | 04-131620 | 5/1992 |
| JP | 2003-074852 | 3/2003 |
| JP | 2004-150779 | 5/2004 |
| JP | 2004-162959 | 6/2004 |

OTHER PUBLICATIONS

Ishizuka, Satoru, "On the Behavior of Premixed Flames in a Rotating Flow Field: Establishment of Tubular Flames," Twentieth Symposium (International) on Combusition/The Combustion Institute, 1984, pp. 287-294.
International Search Report issued in corresponding application No. PCT/JP2007/070232, completed Nov. 16, 2007 and mailed Dec. 4, 2007.
Office Action dated May 31, 2011 in corresponding Canadian Application No. 2,667,047.
Patent Abstracts of Japan corresponding to JP 59-147921, downloaded Mar. 13, 2013, filed herewith as Exhibit A.
European Search Report issued in corresponding application 07829966.6 on Apr. 14, 2014.

* cited by examiner

Fig.10A
Fig.10B
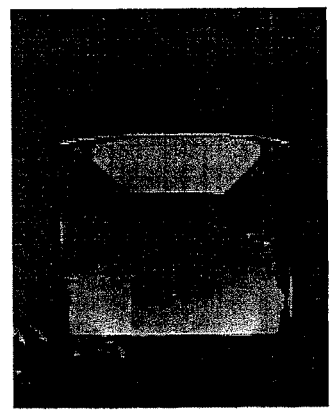
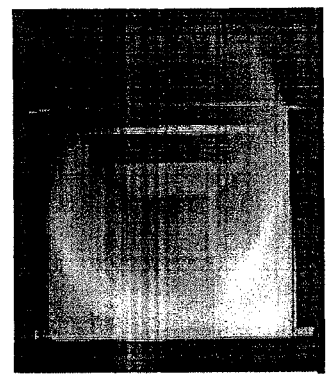
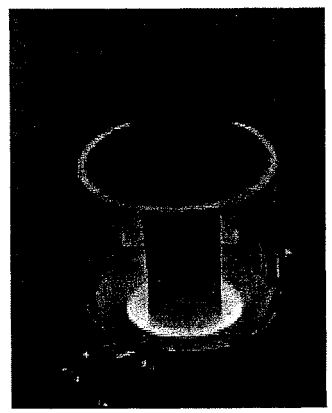
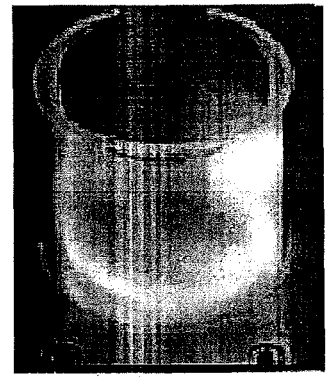

GAS TURBINE COMBUSTOR

This is a National Phase Application in the United States of International Patent Application No. PCT/JP2007/070232 filed Oct. 17, 2007, which claims priority on Japanese Patent Application No. 2006/285906, filed Oct. 20, 2006. The entire disclosures of the above patent applications are hereby incorporated by reference.

BACKGROUND OF THE INVENTION

1. Technical Field of the Invention

The present invention relates to a gas turbine combustor for use in an electric generation device and a propulsion device.

2. Description of the Related Art

As a distributed energy system, there has been a need for a small-sized electric generation device for use at home (for example, a driving power source of a wheelchair) and a small-sized gas turbine is planned as a driving source thereof.

A small size, operational stability, and cleanliness of exhaust are important to a gas turbine combustor, which was previously suggested in Patent Documents 1 to 3.

A tubular flame associated with the invention is disclosed in Non-patent Document 1.

A "micro gas turbine combustor" described in Patent Document 1 is directed to decrease in size and compaction. As shown in FIG. 1, combustors 50 are annularly disposed around a virtual extension line of a rotation shaft of a turbine and each combustor 50 includes a baffle plate 53 as a partition plate having plural air holes 52 for ejecting compressed air into a combustion chamber 51 and a nozzle 54 for ejecting fuel gas into the combustion chamber 51.

A "gas turbine combustor" described in Patent Document 2 relates to an annular combustor for a micro gas turbine and has an object of simplifying and reducing the entire size of the gas turbine by replacing a thin and long structure with a thick and short structure without deteriorating combustion performance thereof. As shown in FIG. 2, in a meridional cross section of an annular combustor liner 56, the liner 56 has a concave-shaped section in which an upstream portion of combustion gas is directed to the inside in the radial direction, a midstream portion of the combustion gas is turned in a U shape, and a downstream portion of the combustion gas is directed to the outside in the radial direction.

A gas turbine combustor described in Patent Document 3 is directed to cleanliness of exhaust and includes an outer liner 61, an inner liner 62, a closed upstream end 63, and an opened discharge end 64, as shown in FIGS. 3A to 3C. Plural tangential fuel ejectors 65 are disposed in a first plane close to the upstream end with intervals in the circumferential direction, plural tangential fuel ejectors 66 are disposed in a second plane between the first plane and the discharge end 64 with intervals in the circumferential direction, and plural air diluting holes 67 are disposed between the inner liner and the outer liner.

A combustor described in Non-patent Document 1 includes a glass tube (with a diameter of 13.4 mm and a length of 120 mm) and a tangential inlet tube (with a width of 3 mm and a length of 120 mm) as shown in FIG. 4 and supplies premixed fuel in the tangential direction to form a stable annular swirling flame therein.

[Patent Document 1]
Japanese Unexamined Patent Publication No. 2003-74852, entitled "MICRO GAS TURBINE COMBUSTOR"

[Patent Document 2]
Japanese Unexamined Patent Publication No. 2004-150779, entitled "GAS TURBINE COMBUSTOR"

[Patent Document 3]
U.S. Pat. No. 6,684,642, "GAS TURBINE ENGINE HAVING A MULTI-STAGE MULTI-PLANE COMBUSTION SYSTEM"

[Non-patent Document 1]
Satoru Ishizuka, "ON THE BEHAVIOR OF PREMIXED FLAMES IN A ROTATING FLOW FIELD: ESTABLISHMENT OF TUBULAR FLAMES"

As described above, in the gas turbine combustors, a small size and the operational stability and cleanliness of exhaust for use at home are important.

For example, when a small-sized electric generation device with several hundreds watts of capacity is assumed and utilizes hydrocarbon fuel, the volume of a combustion chamber is about 100 $cm^3$ in experience.

However, in such a small-sized combustion chamber, it is not possible to accomplish stable high-load combustion, high combustion efficiency, a low concentration of CO, and NOx.

SUMMARY OF THE INVENTION

The invention is contrived in view of the above-mentioned problems. That is, an object of the invention is to provide a gas turbine combustor capable of accomplishing stable high-load combustion, high combustion efficiency, a low concentration of CO, and NOx in a small-sized combustion chamber.

According to an aspect of the invention, there is provided a gas turbine combustor having an inner liner and an outer liner surrounding a center axis and being concentric and cylindrical and an end liner closing between upstream ends of the inner liner and the outer liner and forming a hollow cylindrical combustion chamber therein, the gas turbine combustor including: a swirling air flow forming device introducing combustion air into the vicinity of the end liner in the combustion chamber from the outside and forming a swirling air flow surrounding the center axis; a fuel ejector ejecting fuel in the swirling direction of the swirling air flow to form a premixed swirling flow; and an igniter igniting the premixed swirling flow to form a tubular flame surface.

According to an exemplary embodiment of the invention, the combustion chamber may include a primary combustion chamber disposed close to the end liner and having a relatively small outer diameter and a secondary combustion chamber disposed downstream of the primary combustion chamber and having a relatively large outer diameter. An annular restrictor reducing the outer diameter of the primary combustion chamber may be disposed between the primary combustion chamber and the secondary combustion chamber.

The swirling air flow forming device may include: an annular member disposed at an end close to the end liner in the inner surface of the outer liner to form the primary combustion chamber therein; and a combustion air hole penetrating the outer surface of the annular member in the swirling direction of the swirling air flow in the primary combustion chamber.

The fuel ejector may include a fuel ejecting tube ejecting the fuel into the swirling air flow in the primary combustion chamber through the combustion air hole.

A diluting air hole supplying diluting air along a flow of combustion gas passing through the restrictor may be disposed downstream of the restrictor in the inner liner.

According to the above-mentioned configurations, even when the annular combustion chamber has a small size of about 100 $cm^3$, it was confirmed from examples to be described later that it is possible to enable the stable high-load combustion, to obtain the high combustion efficiency, and to accomplish the low concentration of CO and NOx.

Particularly, in the configuration in which the restrictor is disposed between the primary combustion chamber and the secondary combustion chamber, it was confirmed that a tubular flame is formed upstream of the restrictor (in the primary combustion chamber) and the diffusion of the flame is markedly suppressed as small as possible.

This is because the swirling mixture on the upstream side of the restrictor is promoted and almost homogeneous mixture is performed in the circumferential direction to form a tubular flame by narrowing the swirling flow. The flame has a tubular stable reaction zone and enables almost complete combustion.

Since the flame is stably formed in a state where it is floating in space, "a burnt deposit on a wall surface" due to the overheating was not generated.

Since the diluting air hole supplying the diluting air along the flow of the combustion gas passing through the restrictor is disposed downstream of the restrictor of the inner liner, it was confirmed from examples to be described later that the equivalent ratio of the blowoff limit can be reduced to a half and the stability of the intra-restrictor combustion (intra-restrictor swirling flame and intra-restrictor swirling and diffusing flame) can be enhanced.

BRIEF DESCRIPTION OF THE DRAWINGS

FIG. 10 is a picture illustrating combustion statuses.

DESCRIPTION OF THE PREFERRED EMBODIMENT

Figure 1:
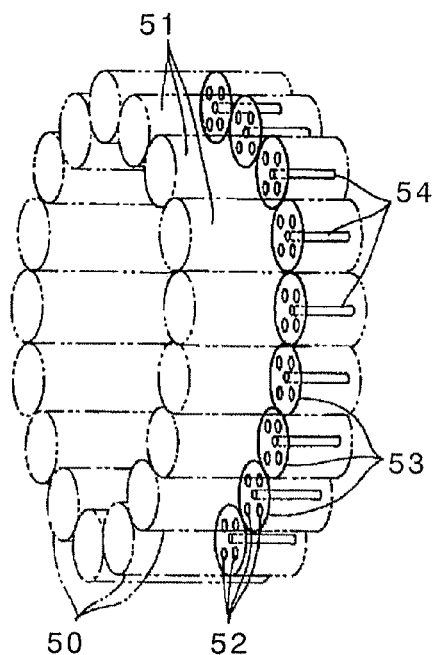
FIG. 1 is a diagram schematically illustrating a "micro gas turbine combustor" described in Patent Document 1.
Figure 2:
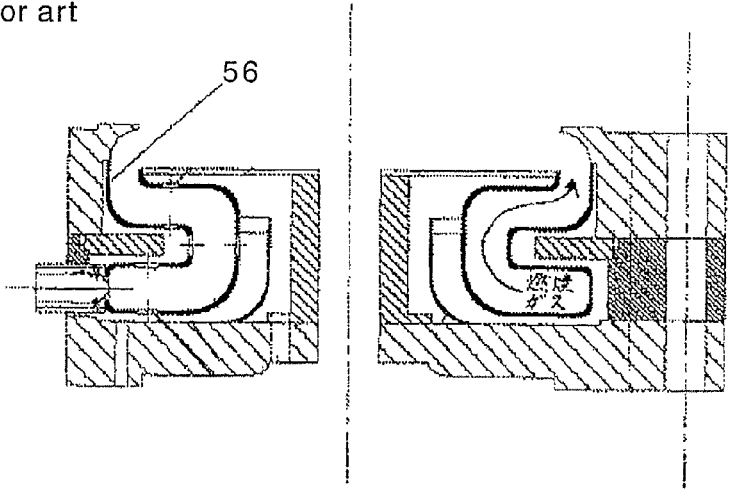
FIG. 2 is a diagram schematically illustrating a "gas turbine combustor" described in Patent Document 2.
Figure 3A:
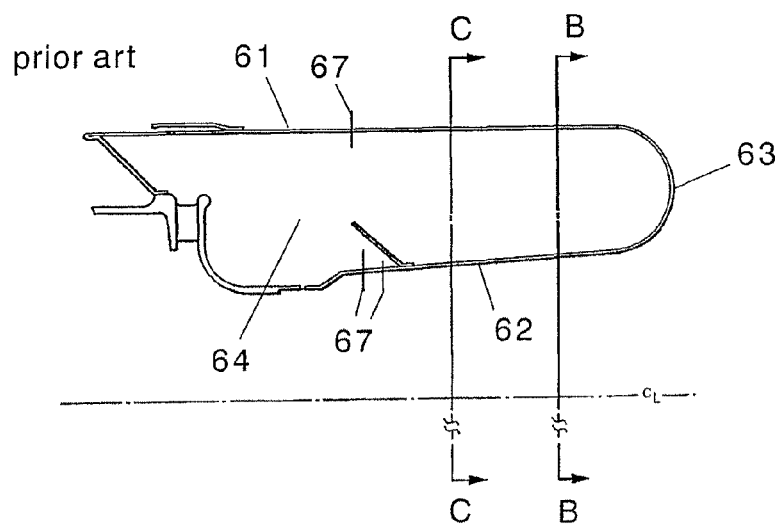
FIG. 3 is a diagram schematically illustrating a gas turbine combustor described in Patent Document 3.
Figure 3B:
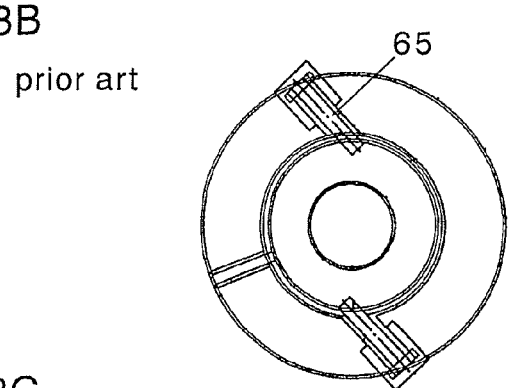
Figure 3C:
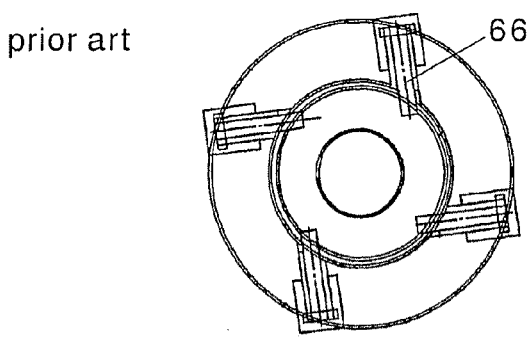
Figure 4:
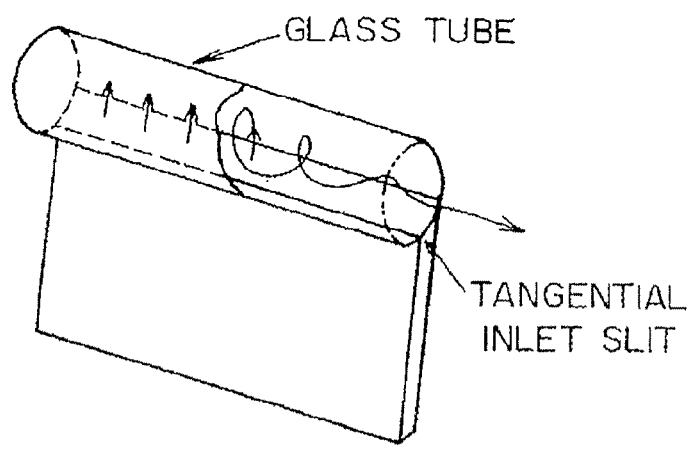
FIG. 4 is a diagram schematically illustrating a combustor described in Non-patent Document 1.

Hereinafter, exemplary embodiments of the invention will be described with reference to the accompanying drawings. In the drawings, like reference numerals reference like elements and repeated description thereof is omitted.

Figure 5:
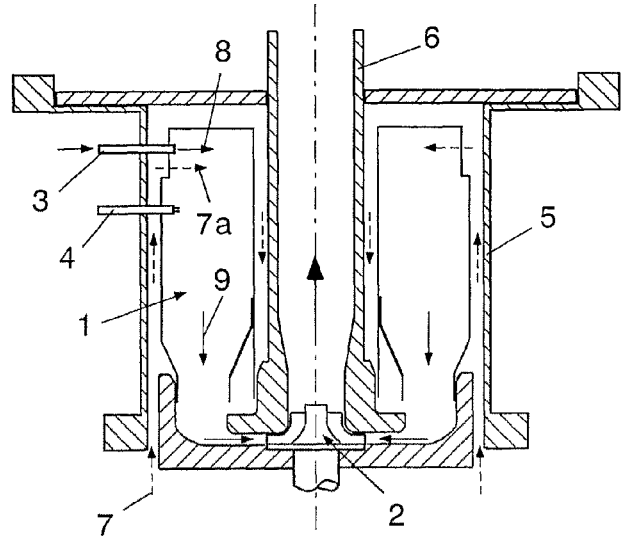
FIG. 5 is a diagram schematically illustrating an example of a small-sized electric generating device.

FIG. 5 is a diagram schematically illustrating an example of a small-sized electric generation device to which the invention is applied.

In the drawing, reference numeral 1 represents a combustor, reference numeral 2 represents a turbine, reference numeral 3 represents a fuel ejecting hole, reference numeral 4 represents an ignition plug, reference numeral 5 represents a casing, and reference numeral 6 represents a discharge tube. The combustor 1 is disposed between the casing 5 and the discharge tube 6 and preferably has a hollow cylindrical shape. One end (upper end in the drawing) is closed and the other end (lower end in the drawing) is opened.

Air 7 (combustion air 7a) reaches the vicinity of the combustor 1 through a gap between the casing 5 and the combustor 1 and flows to the inside (combustion chamber) of the combustor 1 through an opening not shown. Fuel 8 is ejected into the combustor 1 from the fuel ejecting hole 3 and is mixed with the combustion air 7a to form a premixed gas and the premixed gas is ignited by the ignition plug 4 to form a combustion flame therein. The generated combustion exhaust gas 9 is introduced to the turbine 2 to drive the turbine and is discharged to the outside through the inside of the discharge tube 6. The turbine 2 drives an electric generator not shown to generate necessary power.

Figure 6:
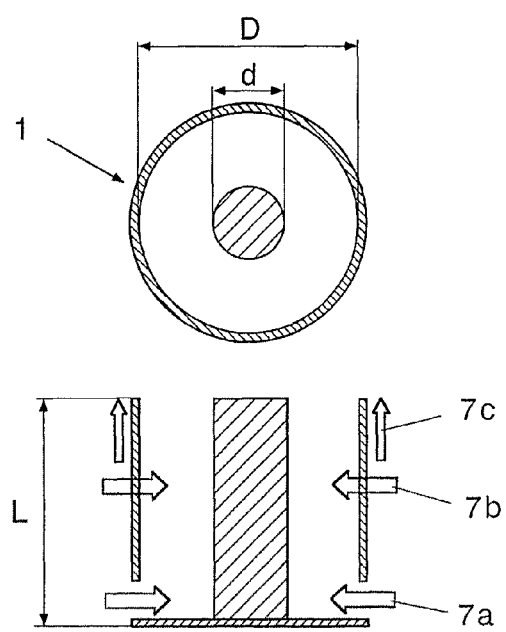
FIG. 6 is a diagram schematically illustrating a shape and a size of a combustor according to an embodiment of the invention.

FIG. 6 is a diagram schematically illustrating a shape and a size of the combustor according to the invention.

In the drawing, reference numerals 7a, 7b, and 7c represent combustion air (primary air), diluting air, and cooling air, respectively.

Figure 7A:
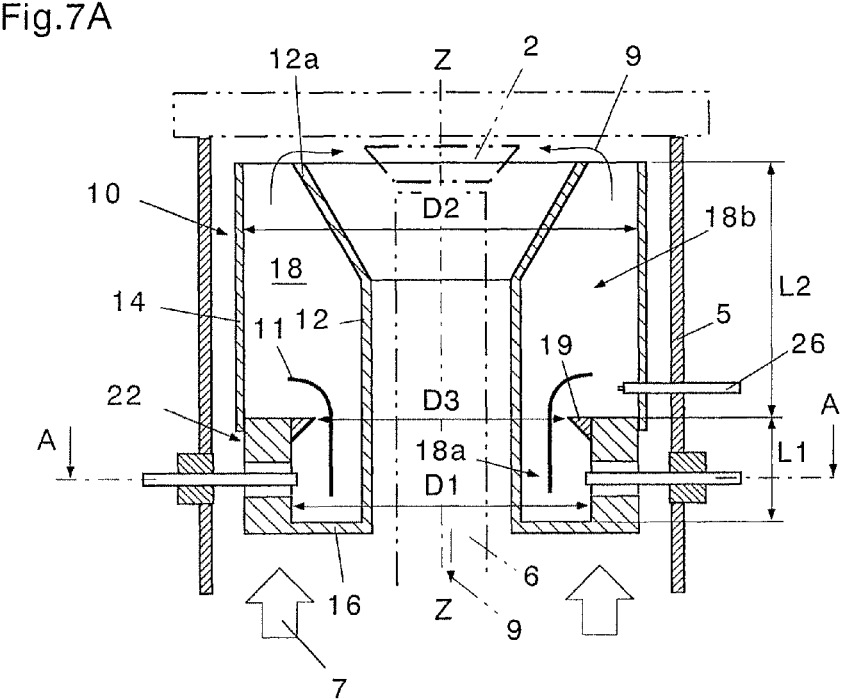
FIG. 7 is a diagram illustrating the entire structure of a gas turbine combustor according to an embodiment of the invention.
Figure 7B:
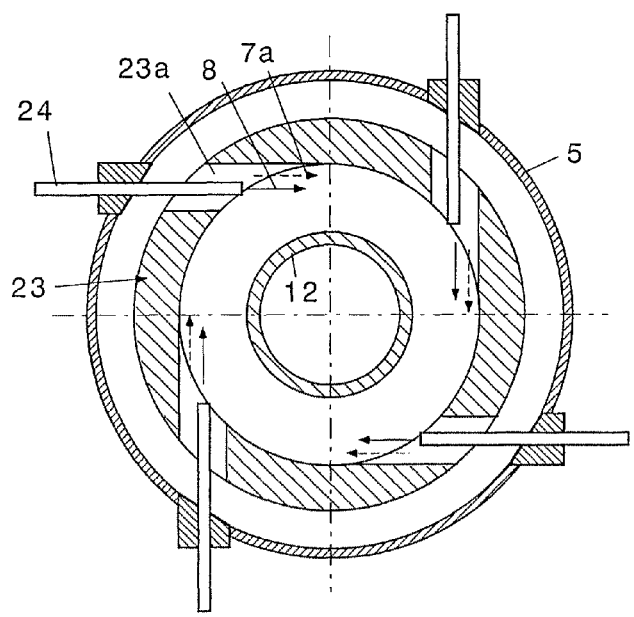

FIGS. 7A and 7B are diagrams illustrating the entire structure of the gas turbine combustor according to the invention, where FIG. 7A is a longitudinal sectional view and FIG. 7B is a sectional view taken along line A-A thereof.

In the drawings, the gas turbine combustor 10 (hereinafter, simply referred to as "combustor") according to the invention includes an inner liner 12, an outer liner 14, and an end liner 16.

The inner liner 12 and the outer liner 14 are cylindrical and are formed concentric around a center axis Z-Z.

The end liner 16 is an annular disk closing between upstream ends (lower end in the drawings) of the inner liner 12 and the outer liner 14. The downstream ends (upper end in the drawings) between the inner liner 12 and the outer liner 14 are opened to discharge the generated combustion exhaust gas 9 to the outside through the turbine 2 and the discharge tube 6.

The combustion chamber 18 of the combustor 10 is an almost annular area surrounded with the inner liner 12, the outer liner 14, and the end liner 16.

The downstream end 12a (upper end in the drawings) of the inner liner 12 is directed to the outside in the radial direction in a tapered shape to form an outlet nozzle to be described later.

In FIG. 7A, the combustion chamber 18 of the combustor 10 includes a primary combustion chamber 18a and a secondary combustion chamber 18b.

The primary combustion chamber 18a is disposed close to the end liner 16 in the combustion chamber 18 and the outer diameter D1 thereof is relatively small.

The secondary combustion chamber 18b is disposed on the downstream side (upside in the drawing) of the primary combustion chamber 18a and the outer diameter D2 thereof is relatively large.

The combustor 10 according to the invention further includes an annular restrictor 19 reducing the outer diameter D1 of the primary combustion chamber 18a on a borderline between the primary combustion chamber 18a and the secondary combustion chamber 18b. The restrictor 19 has a center hole with an inner diameter D3.

In Example 1 to be described later, the outer diameter D1 of the primary combustion chamber 18a is 40 mm and the length L1 thereof is 9.5 mm. The outer diameter D2 of the secondary combustion chamber 18b is 54.5 mm and the length L2 thereof is 50 mm. The inner diameter D3 of the restrictor 19 is 36 mm.

Accordingly, in this example, the diameter ratio of the primary combustion chamber 18a and the secondary combustion chamber 18b is 1:1.36, the length ratio thereof is 1:5.26, and the volume ratio thereof is 1:7.15. The diameter ratio of the outer diameter D1 of the primary combustion chamber 18a and the inner diameter D3 of the restrictor 19 is 1:0.9.

However, the invention is not limited to the above-mentioned numerical values, but may have any value.

The combustor 10 according to the invention further includes a swirling air flow forming device 22, a fuel ejector 24, and a igniter 26.

The swirling air flow forming device 22 introduces the combustion air 7a into the vicinity of the end liner of the combustion chamber 18 (into the primary combustion chamber 18a) from the outside and forms a swirling air flow around the center axis Z-Z.

The fuel ejector 24 ejects the fuel 8 in the swirling direction of the formed swirling air flow to form a premixed swirling flow.

The igniter 26 is, for example, a known ignition plug (for example, a spark plug) and ignites the formed premixed swirling flow to form a tubular flame surface 11.

The swirling air flow forming device 22 includes an annular member 23 and combustion air holes 23a in this example. The annular member 23 is disposed at an end, which is close to the end liner, of the inner surface of the outer liner 14 to form the primary combustion chamber 18a therein. The combustion air holes 23a penetrate the annular member 23 from the outer surface in the swirling direction of the swirling air flow in the primary combustion chamber 18a.

The fuel ejector 24 is a fuel ejecting tube ejecting the fuel 8 to the swirling air flow in the primary combustion chamber 18a through the combustion air holes 23a in this example.

In this example, four combustion air holes 23a are disposed with a constant interval in the circumferential direction and have a rectangular section with a width of 3 mm and a height of 5 mm.

Four fuel ejecting tubes 24 are disposed in the combustion air holes 23a, respectively, and have a through hole with an inner diameter of 1 mm.

According to this configuration, the combustion air 7a can be introduced to the vicinity of the end liner of the combustion chamber 18 from the outside through the combustion air holes 23a to form the swirling air flow around the center axis. It is possible to eject the fuel 8 from the fuel ejecting tubes 24 in the swirling direction of the swirling air flow to form the premixed swirling flow.

It is also possible to ignite the premixed swirling flow by the use of the igniter 26 to form the tubular flame surface.

The number of combustion air holes 23a is not limited to four in the circumferential direction, but may be one or more. The number of fuel ejecting tubes 24 is not limited to four in the circumferential direction, but may be one or more. The sizes are not limited to those of this example, but may be arbitrarily changed.

The swirling air flow forming device 22 is not limited to this example, but a swirler may be formed at the entrance of the combustor to form a swirling air flow in the entire circumferential direction of the combustor.

EXAMPLE 1

Figure 8A:
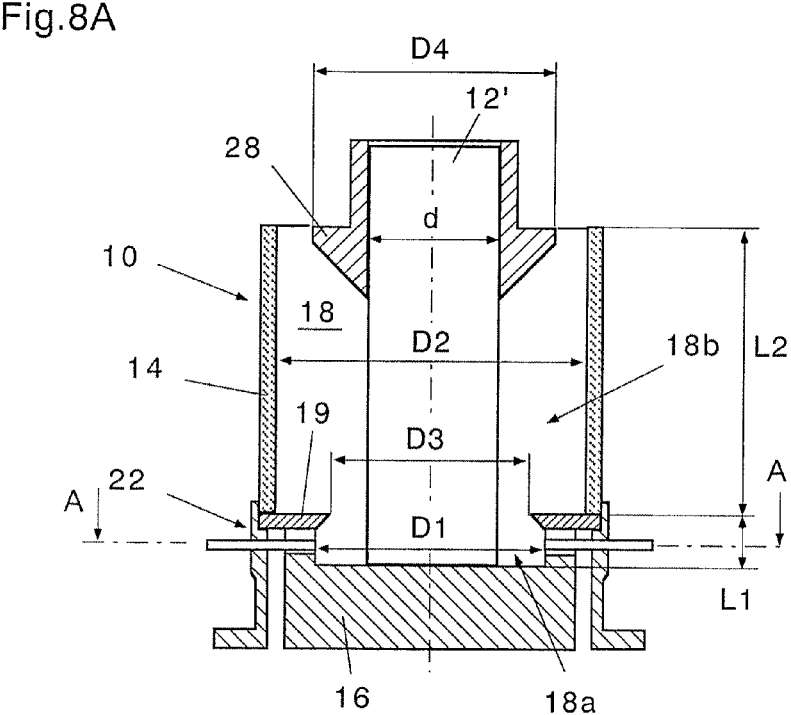
FIG. 8 is a diagram illustrating the entire structure of a test combustor having been subjected to a combustion test.
Figure 8B:
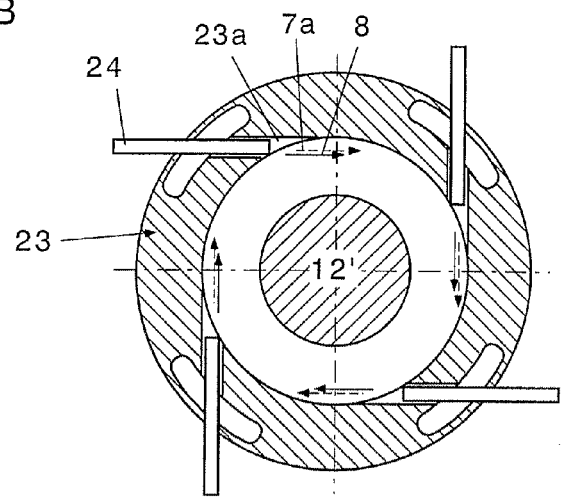

FIGS. 8A and 8B are diagrams illustrating the entire structure of a gas turbine combustor (hereinafter, referred to as a test combustor) according to the invention having been subjected to a combustion test, where FIG. 8A is a longitudinal sectional view and FIG. 8B is a sectional view taken along line A-A thereof.

The test combustor has the inner liner 12 shown in FIGS. 7A and 7B as an actual center rod 12' and an outlet nozzle 28 detachably attached to the top portion thereof. The lower surface of the outlet nozzle 28 is a 45°-tapered surface and the diameter D4 thereof is 42 mm.

The outer liner 14 is formed of quartz glass having high heat resistance to observe the inside.

The other configurations are the same as shown in FIGS. 7A and 7B.

In this example, the outer diameter D1 of the primary combustion chamber 18a is 40 mm and the length L1 thereof is 9.5 mm. The outer diameter D2 of the secondary combustion chamber 18b is 54.5 mm and the length L2 thereof is 50 mm. The inner diameter D3 of the restrictor 19 is 36 mm.

The combustion air holes 23a are disposed at four positions with a constant interval in the circumferential direction and have a rectangular section with a width of 3 mm and a height of 5 mm.

The fuel ejecting tubes 24 are disposed at four positions of the combustion air holes 23a, respectively, and have through holes with an inner diameter of 1 mm.

The combustion test was carried out under the following conditions using the above-mentioned test combustor:

(1) Fuel: propane gas;
(2) Air pre-heating temperature: 170° C.;
(3) Air flow rate: 0.5 to 2.5 g/s;
(4) Existence and non-existence of outlet nozzle 28;
(5) Number of fuel ejecting tubes 24 (two and four); and
(6) Measuring items: flame stability limit and flame shape.

Figure 9:
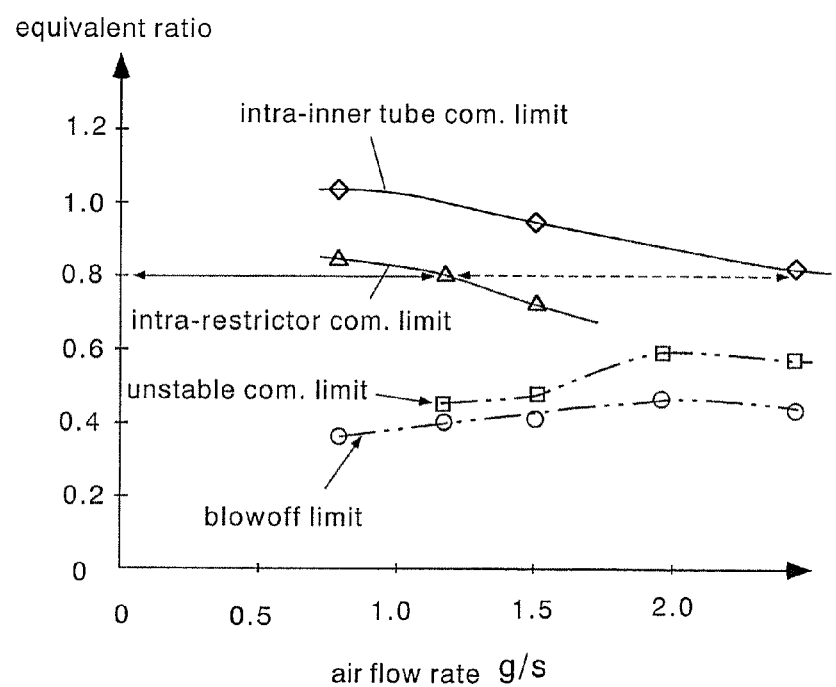
FIG. 9 is a diagram illustrating a test result on combustion stability when an outlet nozzle is provided and the number of fuel ejecting tubes is 4.

FIG. 9 shows a test result on the combustion stability when the outlet nozzle 28 is provided and the number of fuel ejecting tubes 24 is four. FIG. 10A is a picture (side picture: upside and perspective picture: downside) illustrating a combustion status under the condition of FIG. 9.

In FIG. 9, the horizontal axis represents the air flow rate and the vertical axis represents the equivalent ratio. In the equivalent ratio, 1 or less means the lean combustion when the theoretical air fuel ratio (fuel/necessary air amount) is 1.0.

In the drawing, mark "O" represents a blowoff limit, mark "□" represents an unstable combustion limit, mark "Δ" represents an intra-restrictor combustion limit, and mark "◇" represents an intra-inner tube combustion limit.

In FIG. 9, the "intra-restrictor combustion" means a combustion status where a tubular flame is formed on the upstream side of the restrictor 19 (in the primary combustion chamber 18a) as shown in FIG. 10A. In case of the intra-restrictor combustion, in this example, it was confirmed from the test that the stable combustion is possible in a very wide range of air flow rate of 0 to 1.2 g/s at an equivalent ratio of 0.8 and the diffusion of the flame can be markedly suppressed small.

The flame had an annular stable reaction zone as shown in FIG. 10A and enabled almost complete combustion.

Since the flame is stably formed in a state where it is floating in space, the "burnt deposit on a wall surface" due to the overheating was not generated.

In FIG. 9, the "intra-inner tube combustion" means a combustion status where an annular flame is formed on the downstream side of the restrictor (in the secondary combustion chamber 18b). In case of the intra-inner tube combustion, in this example, it was confirmed from the test that the stable combustion is possible in a very wide range of air flow rate of 1.2 to 2.5 g/s at an equivalent ratio of 0.8.

The flame had an annular stable reaction zone and enabled almost complete combustion.

Since the flame is stably formed in a state where it is floating in space, the "burnt deposit on a wall surface" due to the overheating was not generated.

Therefore, it was confirmed from the test result that the above-mentioned test combustor enabled the stable combustion in a very wide combustion area even when the equivalent ratio is made to vary in the range of 0.6 to 0.9.

For example, when the primary air ratio is 40%, the point with the air flow rate of 1.65 g/s and the equivalent ratio of 0.8 in FIG. 9 means a condition where the same combustion load rate as the known gas turbine combustor can be accomplished. Accordingly, it was confirmed from the drawing that it is possible to accomplish the stable high-load combustion at a combustion load rate equivalent to the known gas turbine combustor and to obtain high combustion efficiency by the configuration according to the invention, even when the hollow cylindrical combustion chamber has a small size of about 100 $cm^3$.

Particularly, in case of the "intra-restrictor combustion," the combustion chamber is substantially only the primary combustion chamber 18a and it can be seen that the combustion load rate is raised to about 8 times.

When the outlet nozzle 28 is not provided and the number of fuel ejecting tubes 24 is two, it was also confirmed that it is possible to obtain the same result as shown in FIG. 9, thereby enabling the stable combustion in a very wide combustion area.

Under these conditions, it was confirmed from the measurement result of the combustion exhaust gas that the concentration of CO in the exhaust gas and NOx are sufficiently low when the stable combustion is accomplished.

The same effect can be obtained even when the sectional shape of the restrictor 19 is changed to be planar, semicircular, or equilateral-triangular.

FIG. 10B is a picture illustrating a combustion status where the restrictor 19 is not provided under the same condition as shown in FIG. 9.

As shown in FIG. 10B, when the restrictor 19 is not disposed between the primary combustion chamber 18a and the secondary combustion chamber 8b, the flame was formed in a line shape along the inner surface of the outer liner. Accordingly, since the flame is not diffused in the entire combustor but the flame is formed along the wall surface of the combustor, the burnt deposit on a wall surface due to the overheating of the wall surface was generated.

In this case, the concentration of CO in the combustion exhaust gas was high, which resulted in some mixed gas not passing the flame.

As described above, according to the above-mentioned configuration, even when the hollow cylindrical combustion chamber has a small size of about 100 $cm^3$, it was confirmed from the example that it is possible to accomplish the stable high-load combustion, to obtain high combustion efficiency, and to accomplish the low concentration of CO and NOx.

Particularly, in the configuration where the restrictor is disposed between the primary combustion chamber and the secondary combustion chamber, the tubular flame is formed on the upstream side of the restrictor (in the primary combustion chamber) and the diffusion of the flame can be markedly suppressed small.

The flame had an annular stable reaction zone and enabled almost complete combustion.

Since the flame is stably formed in a state where it is floating in space, the "burnt deposit on a wall surface" due to the overheating was not generated.

In the above-mentioned example, the diameter ratio of the outer diameter D1 of the primary combustion chamber 18a and the restrictor 19 is 1:0.9. The invention is not limited to the ratio, but may be arbitrarily changed.

The above-mentioned combustor according to the invention is suitable for application to an annular combustor, but the invention is not limited to the annular combustor. The invention may be applied to a can-type combustor by setting a burner portion to the same structure.

EXAMPLE 2

Figure 11:
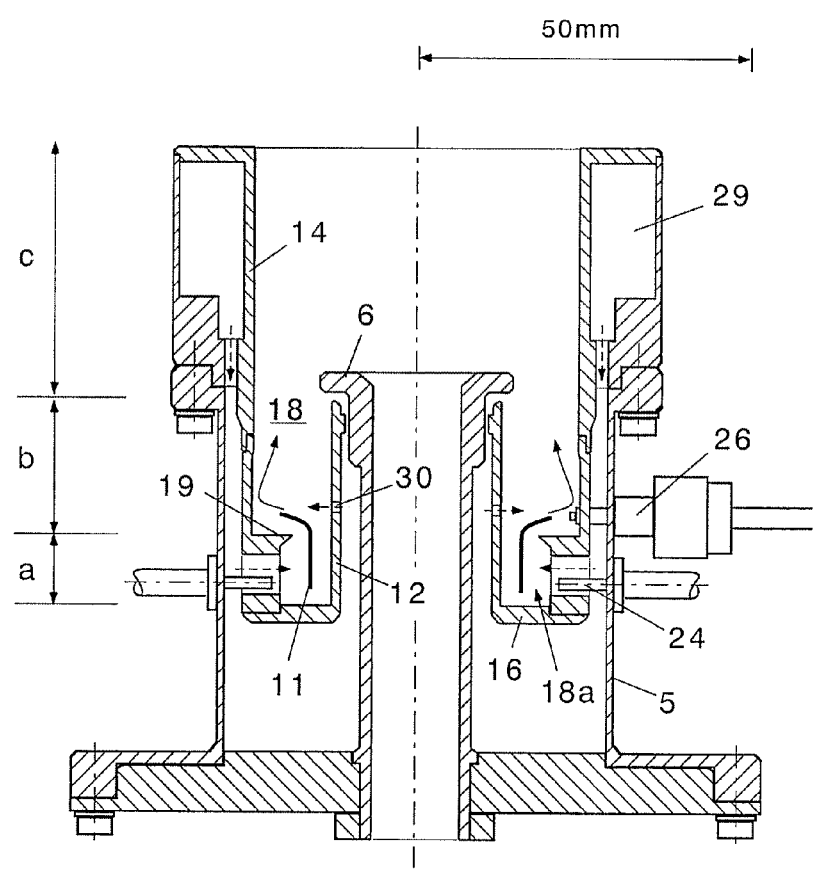
FIG. 11 is a whole longitudinal sectional view illustrating a prototype combustor having been subjected to a combustion test.

FIG. 11 is a longitudinal sectional view illustrating the entire structure of a prototype combustor having been subjected to a combustion test. In this example, the condition is the same as shown in FIG. 9 but the outlet nozzle 28 is not provided. To observe the flame shape and the liner, the end plate of the outer liner 14 is removed.

Room-temperature air was supplied to an air chamber 29 and the combustion air was supplied to the outside of the outer liner 14 therefrom. In the distribution ratio of the combustion air, the combustion air 7a was 45%, the diluting air 7b was 45%, and the cooling air 7c was 10%.

In this example, diluting air holes 30 supplying the diluting air along the flow of the combustion gas passing through the restrictor 19 is disposed downstream of the restrictor 19 in the inner liner 12. In the volume of the inner liner 12, the length is a half of that of Example 1.

The other basic configurations and sizes were the same as shown in FIG. 7.

Hereinafter, the downstream side of the restrictor 19 in FIG. 11 is called "area a", the area from the restrictor 19 to the upper end of the inner liner 12 is called "area b", and the outside of the inner liner 12 is called "area c."

Figure 12:
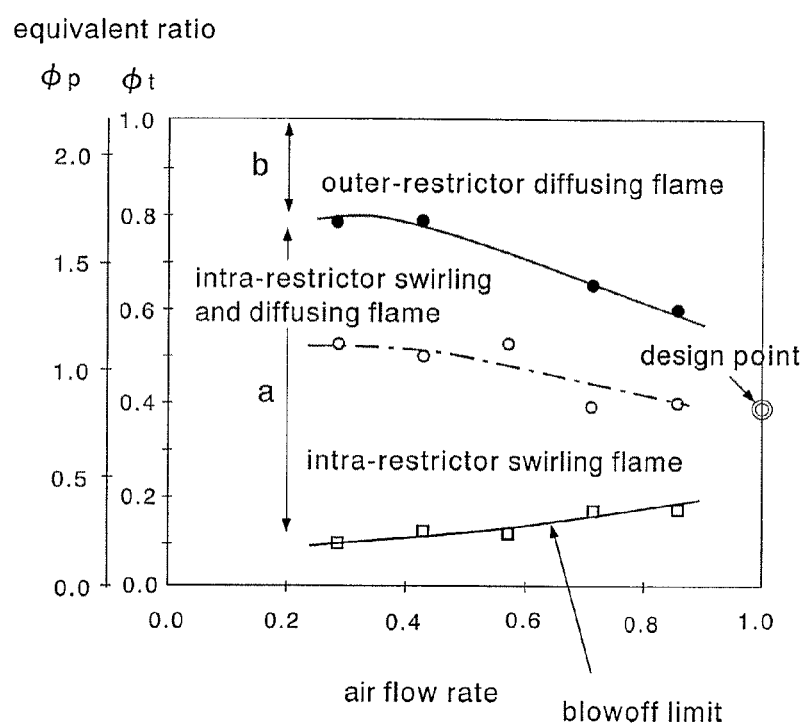
FIG. 12 is a diagram illustrating a flame stability limit, where the number of fuel ejecting tubes is 4.
Figure 13:
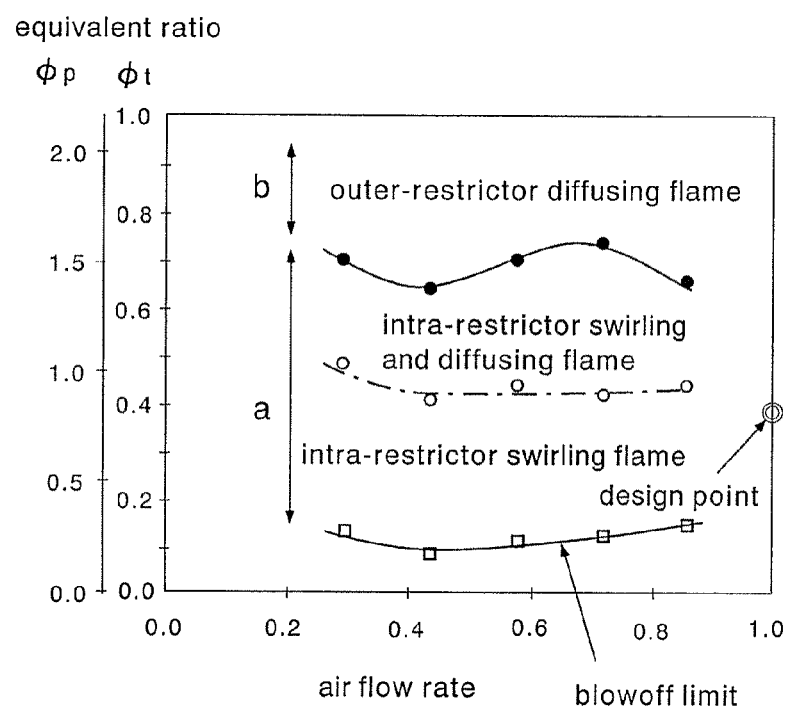
FIG. 13 is a diagram illustrating a flame stability limit, where the number of fuel ejecting tubes is 2.

FIG. 12 is a diagram illustrating the flame stability limit when the number of fuel ejecting tubes is four and FIG. 13 is a diagram illustrating the flame stability limit when the number of fuel ejecting tubes is two. When the number of fuel ejecting tubes is two, the fuel was supplied from the opposed positions. When the number of fuel ejecting tubes is four, the fuel was supplied from four positions having an angle difference of 90°.

In FIGS. 12 and 13, the horizontal axis represents a ratio with respect to a designed amount of air, $\phi t$ represents the equivalent ratio of the entire combustor calculated from the entire amount of air, and $\phi p$ represents the equivalent ratio of the primary combustion section calculated from the amount of combustion air. The designed point of the combustor is represented by a double circle in the drawings. In the drawings, reference signs a and b correspond to area a and area b of FIG. 11.

FIGS. 12 and 13 show that the equivalent ratio of the blowoff limit is reduced to half and the stability of the intra-restrictor combustion (area a: the intra-restrictor swirling flame and the intra-restrictor swirling and diffusing flame) is improved, in comparison with Example 2.

That is, since the diluting air holes 30 supplying the diluting air along the flow of the combustion gas passing through the restrictor 19 are disposed downstream of the restrictor 19 in the inner liner 12, the stability of the flame is greatly improved.

The position of the diluting air holes 30 is located downstream by the same distance as the gap of the restrictor from the restrictor 19 in this example, but may be located within twice the gap of the restrictor just from the restrictor 19. The number of diluting air holes 30 was 16 in the circumference in this example, but the number may be from 4 to 32 in the range of the diluting air 7b of 30% to 60%.

When the number of fuel ejecting tubes is two and when the number of fuel ejecting tubes is four, the stability of flame was equivalent and both satisfied the requirement for the combustor.

It was confirmed from the results shown in FIGS. 12 and 13 that the above-mentioned prototype combustor can accomplish the stable combustion in a very wide combustion area when the equivalent ratio φt is changed in the range of 0.2 to 0.6 in any case where the number of fuel ejecting tubes is four and two.

In the configuration according to the invention, even when the hollow cylindrical combustion chamber has a small size of about 100 cm$^3$, it was confirmed that it is possible to accomplish the stable high-load combustion at the same combustion load rate as the known gas turbine combustor and to obtain high combustion efficiency.

Particularly, in case of the "infra-restrictor combustion" (area a), it could be seen that the combustion chamber is substantially only the primary combustion chamber 18a and the combustion load rate is enhanced to about 8 times.

The invention is not limited to the above-mentioned embodiments, but may be modified in various forms without departing from the gist of the invention.

The invention claimed is:

1. A gas turbine combustor comprising:
   (a) an inner liner and an outer liner surrounding a center axis and that are concentric and cylindrical, and an end liner disposed between upstream ends of the inner liner and the outer liner, wherein the gas turbine combustor forms a combustion chamber that is an area surrounded by the inner liner, the outer liner, and the end liner, wherein the combustion chamber includes a primary combustion chamber disposed close to the end liner and a secondary combustion chamber disposed downstream of the primary combustion chamber, wherein the primary combustion chamber is annular and surrounds the center axis, and wherein an annular restrictor reducing the outer diameter of the primary combustion chamber is disposed between the primary combustion chamber and the secondary combustion chamber;
   (b) a swirling air flow forming device disposed to introduce combustion air into a vicinity of the end liner in the annular primary combustion chamber from outside and form a swirling air flow surrounding the center axis;
   (c) a fuel ejector disposed to eject fuel to the annular primary combustion chamber in the swirling direction of the swirling air flow to form a premixed swirling flow to form a tubular flame surface when ignited; and
   (d) an igniter disposed to ignite the premixed swirling flow of the swirling air flow and the fuel to form a tubular flame surface
   wherein the swirling air flow forming device includes
   an annular member disposed at an end close to the end liner in the inner surface of the outer liner to form the primary combustion chamber therein, wherein the annular member has a thickness greater than a thickness of the outer liner; and
   a combustion air hole penetrating an outer surface of the annular member in the swirling direction of the swirling air flow in the primary combustion chamber.

2. The gas turbine combustor according to claim 1, wherein the fuel ejector includes a fuel ejecting tube disposed to inject the fuel into the swirling air flow in the primary combustion chamber through the combustion air hole.

3. The gas turbine combustor according to claim 1, wherein a volume of the combustion chamber is about 100 cm$^3$.

4. The gas turbine combustor according to claim 1, wherein the tubular flame surface is disposed to float in space during combustion of the fuel of the premixed swirling flow so that a burnt deposit is not generated on a first wall surface of the primary combustion chamber and a burnt deposit is not generated on a second wall surface of the secondary combustion chamber.

5. The gas turbine combustor according to claim 2, wherein the fuel ejector is disposed coaxially within the combustion air hole, and the combustion air hole and the fuel ejector are arranged to direct the swirling air flow at an inner surface of the annular member in a direction substantially normal to a radius extending from the center axis to the inner surface of the annular member.

6. The gas turbine combustor according to claim 5, wherein volume of the combustion chamber is about 100 cm$^3$.

7. The gas turbine combustor according to claim 5, wherein the tubular flame surface is disposed to float in space during combustion of the fuel of the premixed swirling flow so that a burnt deposit is not generated on a first wall surface of the primary combustion chamber and a burnt deposit is not generated on a second wall surface of the secondary combustion chamber.

8. The gas turbine combustor according to claim 1, wherein the secondary combustion chamber has a larger outer diameter than the primary combustion chamber.

9. The gas turbine combustor according to claim 1, wherein a diluting air hole disposed to supply diluting air along a flow of combustion gas passing through the annular restrictor is disposed downstream of the annular restrictor in the inner liner.

* * * * *